UNITED STATES PATENT OFFICE.

HAMILTON YOUNG CASTNER, OF LONDON, ENGLAND.

PURIFYING ALUMINIUM CHLORIDES.

SPECIFICATION forming part of Letters Patent No. 409,668, dated August 27, 1889.

Application filed March 19, 1889. Serial No. 303,901. (No specimens.)

*To all whom it may concern:*

Be it known that I, HAMILTON YOUNG CASTNER, a citizen of the United States of America, residing at 115 Cannon Street, in the city of London, England, have invented a certain new and useful Process for the Production of Pure Double Chlorides of Aluminium; and I do hereby declare that the following is a full, clear, and exact description of the invention, which will enable others skilled in the art to which it appertains to make and use the same.

The object of this invention is to purify the anhydrous double chlorides of aluminium.

Although reference is only made herein to the double chloride of aluminium and sodium, it will be evident that the process is equally applicable to other double-chloride compounds of aluminium—such, for instance, as the double chloride of aluminium and potassium. In the production of metallic aluminium from the double chloride (by the action of sodium or otherwise) it is of great importance that this compound should be pure. The double chloride of aluminium and sodium is now generally manufactured by passing chlorine gas over or through a highly-heated mixture of alumina, carbon, and salt contained in fire-clay retorts, the double chloride formed by reaction being distilled and condensed in receivers attached to the said retorts, through which the vapors are made to pass. In manufacturing the double chloride in this manner it becomes much contaminated with ferrous and ferric chloride produced by the action of the chlorine gas and carbon monoxide upon the iron contained in the materials composing the charge, and also contained in the fire-clay of which the retorts are composed. In the subsequent treatment of this impure double chloride with sodium for the production of aluminium both the chlorides of iron and aluminium are reduced to the metallic state, yielding an aluminium of inferior quality, due to the presence of iron, the proportion of the same in the aluminium produced depending upon the quantity of iron contained in the crude chloride employed.

So far as I am aware, prior to my present invention no one has devised means for eliminating the iron from the double chloride, and this most desirable result is what I effect.

To this end my invention consists in the treatment of impure double chloride by either aluminium, sodium, or potassium in such proportions as will only decompose the chloride of iron and precipitate the iron in a metallic form, leaving the double chloride pure. To effect this purification, it is generally desirable that the crude chlorides be melted and to the molten bath sufficient aluminium (in any convenient form, but preferably in a fine state of division) be added to combine with all the chlorine contained in the ferrous and ferric chlorides in the charge. The aluminium added reacts at a low temperature (say slightly above the melting-point of the chloride) upon the iron chloride, forming metallic iron and chloride of aluminium. The metallic iron separates and settles from the molten chloride, and the pure chloride may be poured off, filtered, or redistilled. As an example, I may state that good results may be obtained in the following manner: A known quantity—say one thousand pounds—of the crude chloride being placed in a large iron vessel and melted, a sample should be taken and tested as quickly as possible to determine the amount of iron. Assuming that the test shows five per cent., (one-half of one per cent.,) it will then at once be evident that there is a total quantity of five pounds of iron combined with chlorine in the form of chloride in the charge.

As the amount of ferrous chloride is usually small, it may generally be taken as being all in the form of ferric chloride, and as the determined quantity of iron is five pounds, and this is equivalent to 14.51 pounds of ferric chloride, it is at once known that there are 9.51 pounds of chlorine to be separated or extracted from its combination with the iron, and to effect this will require 2.44 pounds of aluminium. The reaction may be stated thus: 14.51 pounds of ferric chloride + 2.44 pounds of aluminium = 11.95 pounds of aluminium chloride + five pounds of metallic iron, or, in chemical symbols—

$$3FeCl_2 + 2Al = 2AlCl_3 + 3Fe$$
$$Fe_2Cl_6 + 2Al = 2AlCl_3 + 2Fe$$

After the addition of the aluminium to the melted chloride the mass should be stirred or agitated, and at the expiration of a few minutes it will be seen that the yellowish color has disappeared and the bath will be practically colorless, with metallic iron in suspension. This will gradually settle, and the clear liquid or pure double chloride may be drawn off and allowed to solidify.

The material at the bottom of the vessel will be found to contain the iron mixed with chloride, and these may be separated by distillation or by filtering the molten chloride through suitable filters, which will collect and retain the iron precipitate. The purified material will be found to be of an opaque white color and much less deliquescent than the crude substance.

Instead of metallic aluminium being added to precipitate the iron, either sodium or potassium may be employed, and where this is done only enough of the alkali metal (preferably sodium) is added to combine with all the chlorine present in the iron chlorides. The alkali metal acts partially on the iron and aluminium chlorides, producing chloride of the alkali metal, metallic iron, and metallic aluminium, while the aluminium so produced reacts on the balance of the iron chlorides, producing metallic iron and aluminium chloride.

If it is desired to employ sodium for purifying such a charge of crude chloride, it would be necessary to employ about 6.6 pounds thereof to produce the 2.44 pounds of aluminium required. In this case the reaction would be $AlCl_3NaCl + 3Na = Al + 4NaCl$, the further reaction being as set forth when aluminium is directly added. In all cases the double chloride, after treatment, is thoroughly purified from iron. Other metals capable of reducing iron from its chloride may be substituted for the precipitation of the iron; but in this case the product would contain the chloride of the metal used. For instance, if magnesium were employed to effect the purification, the iron would be effectively precipitated; but the bath would contain magnesium chloride, and this would be undesirable if the purified material were to be used in the manufacture of aluminium.

It is of course evident that the metal which is to be employed in effecting the purification may be mixed with the charge when in a cold or unmelted state, and also that the purified material may be distilled instead of being simply melted and drawn or ladled off.

Having thus particularly described and ascertained the nature of my said invention and in what manner the same is to be performed, I declare that what I claim is—

The hereinbefore-described process of purifying anhydrous chlorides of aluminium, which consists in melting said chlorides with a suitable quantity of a metal, as aluminium or sodium, adapted to reduce the contained iron to a metallic state, and then separating it, substantially as described.

In testimony whereof I have hereunto set my hand in the presence of two subscribing witnesses.

HAMILTON YOUNG CASTNER.

Witnesses:
GEO. J. B. FRANKLIN,
JNO. DEAN.